(12) United States Patent
Guerrero, Jr. et al.

(10) Patent No.: US 10,912,993 B2
(45) Date of Patent: Feb. 9, 2021

(54) GAME CONTROLLERS AND METHODS FOR CONTROLLING A GAME CONTROLLER

(71) Applicant: RAZER (ASIA-PACIFIC) PTE. LTD., Singapore (SG)

(72) Inventors: Gil Palma Guerrero, Jr., Singapore (SG); Ann Tiong Ong, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/462,482

(22) PCT Filed: Nov. 21, 2016

(86) PCT No.: PCT/SG2016/050572
§ 371 (c)(1),
(2) Date: May 20, 2019

(87) PCT Pub. No.: WO2018/093328
PCT Pub. Date: May 24, 2018

(65) Prior Publication Data
US 2019/0270006 A1    Sep. 5, 2019

(51) Int. Cl.
*A63F 13/24*    (2014.01)
*A63F 13/22*    (2014.01)
(Continued)

(52) U.S. Cl.
CPC .............. *A63F 13/24* (2014.09); *A63F 13/22* (2014.09); *G05G 5/04* (2013.01); *G05G 9/047* (2013.01);
(Continued)

(58) Field of Classification Search
CPC .. A63F 13/24; A63F 13/22; A63F 2300/1018; A63F 2300/1043; G05G 5/04; G05G 9/047
See application file for complete search history.

(56) References Cited

U.S. PATENT DOCUMENTS

| | | |
|---|---|---|
| 4,945,357 A | 7/1990 | Tal |
| 5,799,537 A | 9/1998 | Yoneyama |

(Continued)

FOREIGN PATENT DOCUMENTS

| | | |
|---|---|---|
| CN | 1154165 A | 7/1997 |
| CN | 2784051 Y | 5/2006 |

(Continued)

OTHER PUBLICATIONS

International Search Report and Written Opinion, dated Aug. 21, 2017, for the corresponding International Application No. PCT/SG2016/050572 in 11 pages.

(Continued)

*Primary Examiner* — Omkar A Deodhar
(74) *Attorney, Agent, or Firm* — Polsinelli PC (57) ABSTRACT

According to various embodiments, a game controller may be provided. The game controller may include: a controller input; a receiving portion configured to alternatively receive a first ring or a second ring, wherein the first ring allows a first range of motion of the controller input, and wherein the second ring allows a second range of motion of the controller input; a mechanical switch configured to receive mechanical input from at least one of the first ring or the second ring.

16 Claims, 8 Drawing Sheets

(51) Int. Cl.
*G05G 5/04* (2006.01)
*G05G 9/047* (2006.01)

(52) U.S. Cl.
CPC ............... *A63F 2300/1018* (2013.01); *A63F 2300/1043* (2013.01)

(56) References Cited

U.S. PATENT DOCUMENTS

| | | | |
|---|---|---|---|
| 5,923,317 A * | 7/1999 | Sayler | A63F 13/06 |
| | | | 345/156 |
| 5,963,196 A | 10/1999 | Nishiumi et al. | |
| 6,536,298 B1 | 3/2003 | Bellur et al. | |
| 6,743,100 B1 * | 6/2004 | Neiser | A63F 13/06 |
| | | | 463/37 |
| 8,059,090 B2 | 11/2011 | Ekstrand | |
| 8,241,126 B2 | 8/2012 | Ambinder et al. | |
| 8,602,895 B2 | 12/2013 | Fujisawa et al. | |
| 8,795,078 B1 | 8/2014 | Musick, Jr. et al. | |
| 9,064,371 B2 | 6/2015 | Fujisawa et al. | |
| 9,713,768 B2 | 7/2017 | Uy et al. | |
| 9,804,691 B1 * | 10/2017 | Strahle | G06F 3/033 |
| 2001/0048425 A1 | 12/2001 | Partridge | |
| 2005/0215321 A1 | 9/2005 | Hussaini et al. | |
| 2008/0238872 A1 | 10/2008 | Ekstrand | |
| 2009/0084214 A1 | 4/2009 | Sakai et al. | |
| 2010/0069154 A1 | 3/2010 | Claussen | |
| 2011/0183759 A1 * | 7/2011 | Lin | G06F 3/0338 |
| | | | 463/38 |
| 2013/0084983 A1 | 4/2013 | Masumi et al. | |
| 2014/0018173 A1 | 1/2014 | Urhman | |
| 2014/0057713 A1 | 2/2014 | Fujisawa et al. | |
| 2014/0323220 A1 * | 10/2014 | Lee | A63F 13/24 |
| | | | 463/37 |
| 2015/0238855 A1 | 8/2015 | Uy et al. | |
| 2016/0004355 A1 | 1/2016 | Zadesky et al. | |
| 2016/0202721 A1 | 7/2016 | Bernardy et al. | |
| 2016/0361636 A1 * | 12/2016 | Gassoway | A63F 13/98 |

FOREIGN PATENT DOCUMENTS

| | | |
|---|---|---|
| CN | 2843562 Y | 12/2006 |
| CN | 101443870 A | 5/2009 |
| CN | 101669087 A | 3/2010 |
| CN | 103035072 A | 4/2013 |
| CN | 104492080 A | 4/2015 |
| CN | 105188864 A | 12/2015 |
| JP | 2014-061225 A | 4/2014 |
| WO | WO 2007/040499 A1 | 4/2007 |
| WO | WO 2015/078987 A2 | 6/2015 |
| WO | WO 2015/078990 A1 | 6/2015 |
| WO | WO 2016/110586 A1 | 7/2016 |

OTHER PUBLICATIONS

Ruk_T, Making the stick throw shorter and eliminating huge deadzones in Jap sticks, Tech Talk, May 2011, Shoryuken forums found at http://forums.shoryuken.com/discussion/137768/making-the-stick-throw-shorter-and-eliminating-huge-deadzones-in-jap-sticks in 1 page.
Office Action (including English Translation) dated Feb. 3, 2020, for the corresponding Chinese Application No. 201680091005.7 in 12 total pages.
Extended European Search Report dated Nov. 4, 2019, 8 pages, for the corresponding European Patent Application No. 16921463.2.

* cited by examiner

GAME CONTROLLERS AND METHODS FOR CONTROLLING A GAME CONTROLLER

TECHNICAL FIELD

Various embodiments generally relate to game controllers and methods for controlling a game controller.

BACKGROUND

Game controllers are widely used in computer games. As such, there may be a need for enhanced game controllers.

SUMMARY OF THE INVENTION

According to various embodiments, a game controller may be provided. The game controller may include: a controller input; a receiving portion configured to alternatively receive a first ring or a second ring, wherein the first ring allows a first range of motion of the controller input, and wherein the second ring allows a second range of motion of the controller input; a mechanical switch configured to receive mechanical input from at least one of the first ring or the second ring.

According to various embodiments, a method for controlling a game controller may be provided. The method may include: providing a controller input; providing a receiving portion to alternatively receive a first ring or a second ring, wherein the first ring allows a first range of motion of the controller input, and wherein the second ring allows a second range of motion of the controller input; and receiving mechanical input from at least one of the first ring or the second ring.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the game controller as described in this description may include a memory which is for example used in the processing carried out in the game controller. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

Game controllers are widely used in computer games.

According to various embodiments, an enhanced game controller may be provided.

Figure 1A:
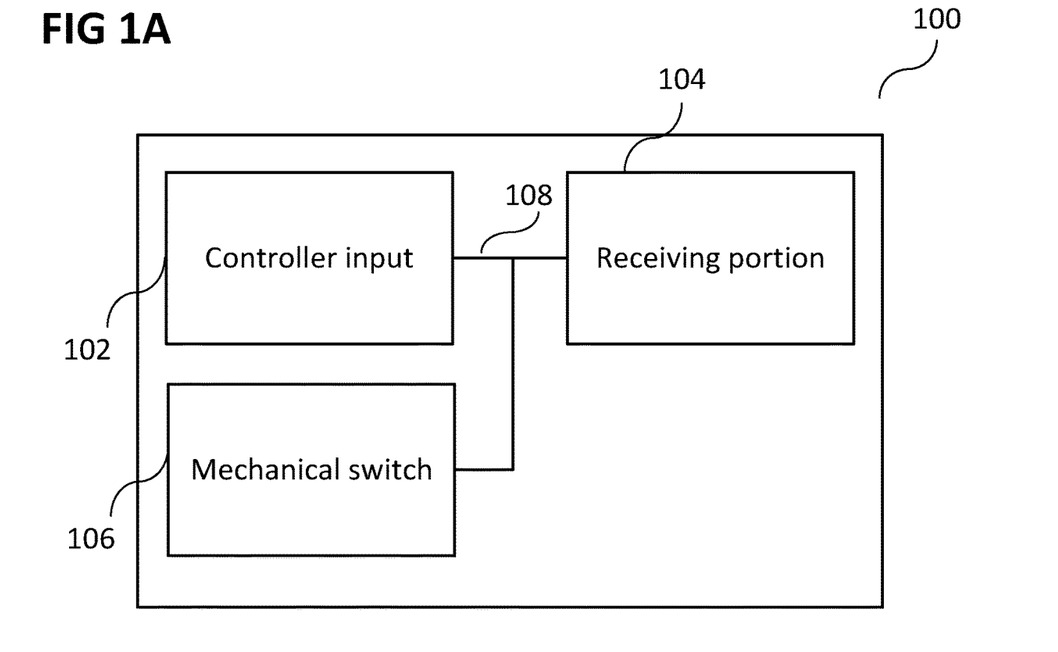
FIG. 1A shows a game controller according to various embodiments.

FIG. 1A shows a game controller 100 according to various embodiments. The game controller 100 may include a controller input 102 (for example a thumb controller; for example a joystick). The game controller 100 may further include a receiving portion 104 configured to alternatively receive a first ring or a second ring. The first ring may allow a first range of motion of the controller input 102. The second ring may allow a second range of motion of the controller input 102. The game controller 100 may further include a mechanical switch 106 configured to receive mechanical input from at least one of the first ring or the second ring. The controller input 102, the receiving portion 104, and the mechanical switch 106 may be coupled with each other, like indicated by lines 108, for example electrically coupled, for example using a line or a cable, and/or mechanically coupled.

In other words, different ranges of motion of a joystick of a game controller may be provided depending on whether a first ring or a second ring is attached to the game controller.

According to various embodiments, the at least one of the first ring or the second ring may include a tab configured to depress the mechanical switch 106.

According to various embodiments, the at least one of the first ring or the second ring may include a tab configured to depress the mechanical switch 106 via an actuator.

According to various embodiments, the first ring may include a tab configured to depress the mechanical switch 106 via an actuator.

According to various embodiments, the second ring may be free from a tab configured to depress the mechanical switch 106 via an actuator.

According to various embodiments, the game controller 100 may be configured to transmit information indicating whether the mechanical switch 106 is depressed to a computing device to which the game controller 100 is connected.

According to various embodiments, the first ring may include a hole of a first diameter configured to surround the controller input 102.

According to various embodiments, the second ring may include a hole of a second diameter configured to surround the controller input 102.

According to various embodiments, the first diameter may be smaller than the second diameter.

According to various embodiments, the first range of motion may be smaller than the second range of motion.

Figure 1B:
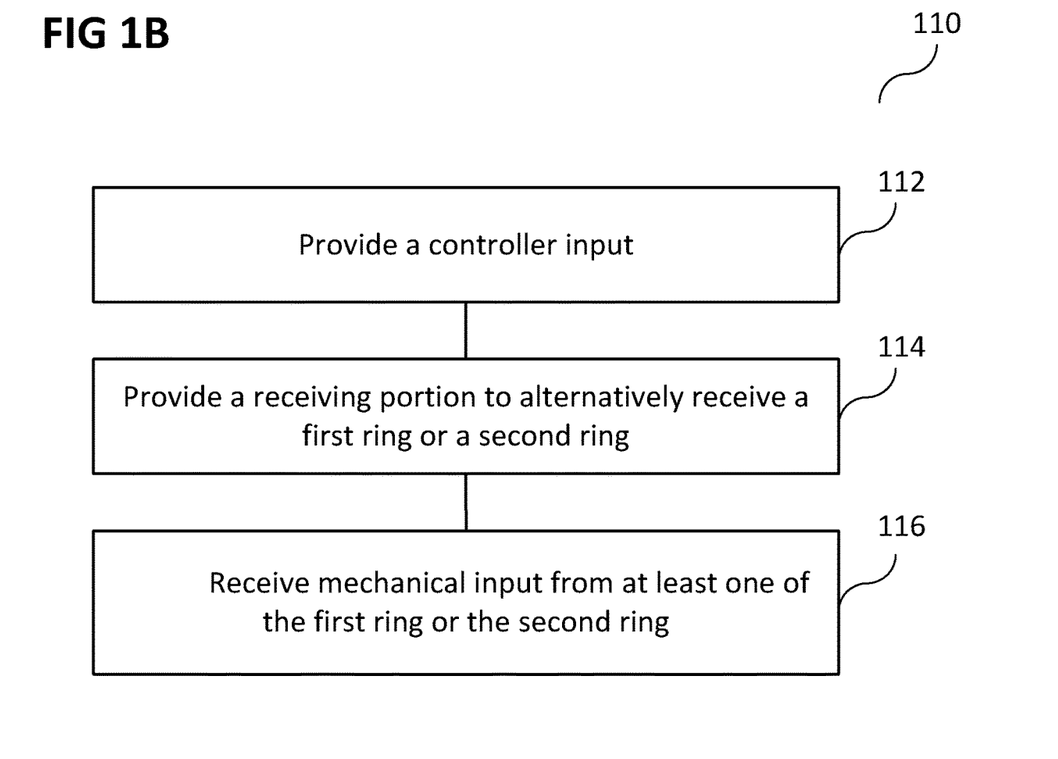
FIG. 1B shows a flow diagram illustrating a method for controlling a game controller according to various embodiments.

FIG. 1B shows a flow diagram 110 illustrating a method for controlling a game controller according to various embodiments. In 112, a controller input may be provided. In 114, a receiving portion may be provided to alternatively receive a first ring or a second ring, wherein the first ring allows a first range of motion of the controller input, and wherein the second ring allows a second range of motion of the controller input. In 116, mechanical input may be received from at least one of the first ring or the second ring.

According to various embodiments, the at least one of the first ring or the second ring may include a tab configured to depress the mechanical switch.

According to various embodiments, the at least one of the first ring or the second ring may include a tab configured to depress the mechanical switch via an actuator.

According to various embodiments, the first ring may include a tab configured to depress the mechanical switch via an actuator.

According to various embodiments, the second ring may be free from a tab configured to depress the mechanical switch via an actuator.

According to various embodiments, the method may further include transmitting information indicating whether the mechanical switch is depressed to a computing device to which the game controller is connected.

According to various embodiments, the first ring may include a hole of a first diameter configured to surround the controller input.

According to various embodiments, the second ring may include a hole of a second diameter configured to surround the controller input.

According to various embodiments, the first diameter may be smaller than the second diameter.

According to various embodiments, the first range of motion may be smaller than the second range of motion.

Figure 2:
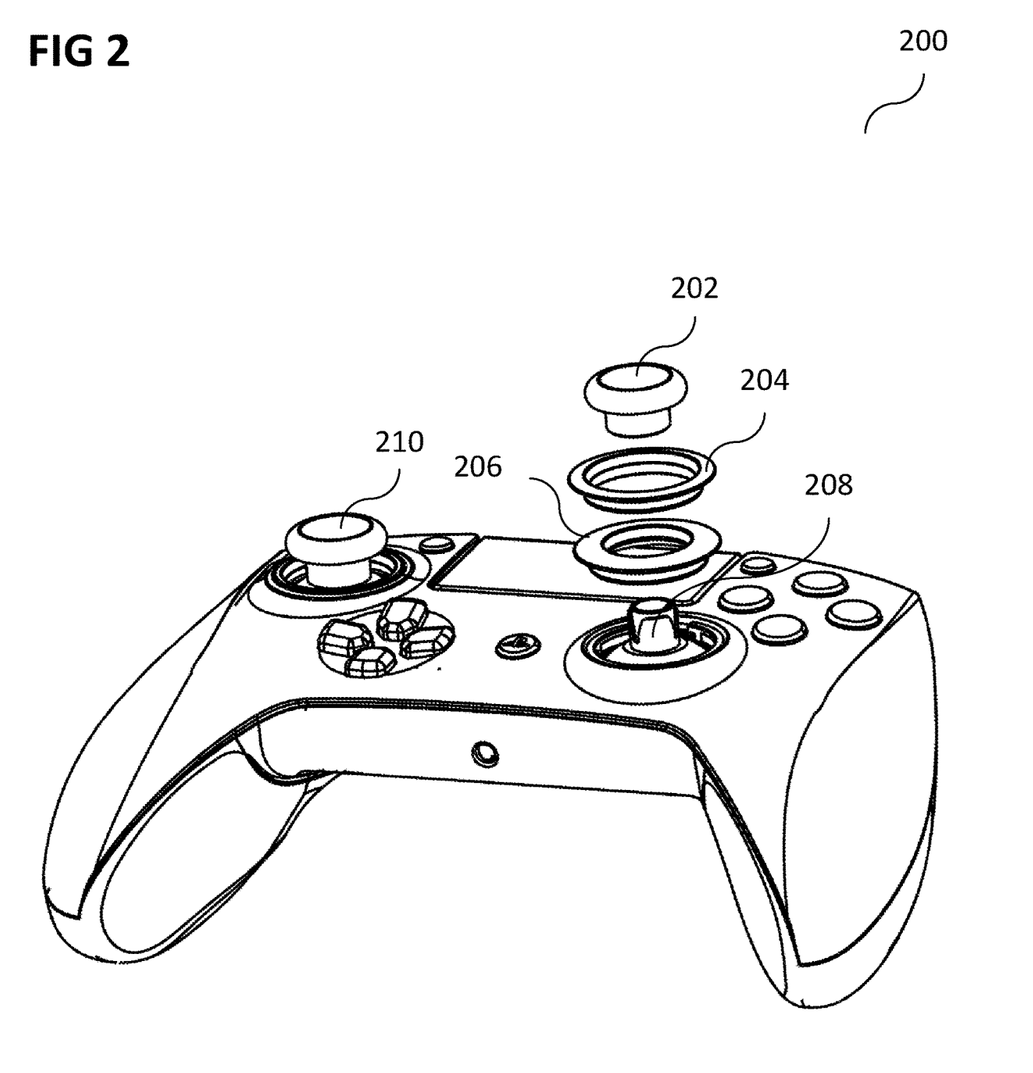
FIG. 2 shows an illustration of a game controller according to various embodiments.

FIG. 2 shows an illustration 200 of a game controller according to various embodiments. The game controller may include a left joystick 210 and a right joystick. The right joystick may include a removable thumb cap 202, a large ring 204 (which may be replaced by a small ring 206), and a counter piece 208 to secure the removable thumb cap 202. The thumb cap 202 may be so called because the thumb is the one controlling the movement of the joystick and the cap may be received by the controller end. However, in an alternative embodiment, the thumb cap 202 may be a plunger, i.e. the thumb cap 202 may have a protrusion under the cap that is inserted into the controller. The right joystick may have the removable thumb cap 202 to be able to put a swappable ring (for example the large ring 206 or the small ring 204) for different game sensitivity configuration.

Figure 3:
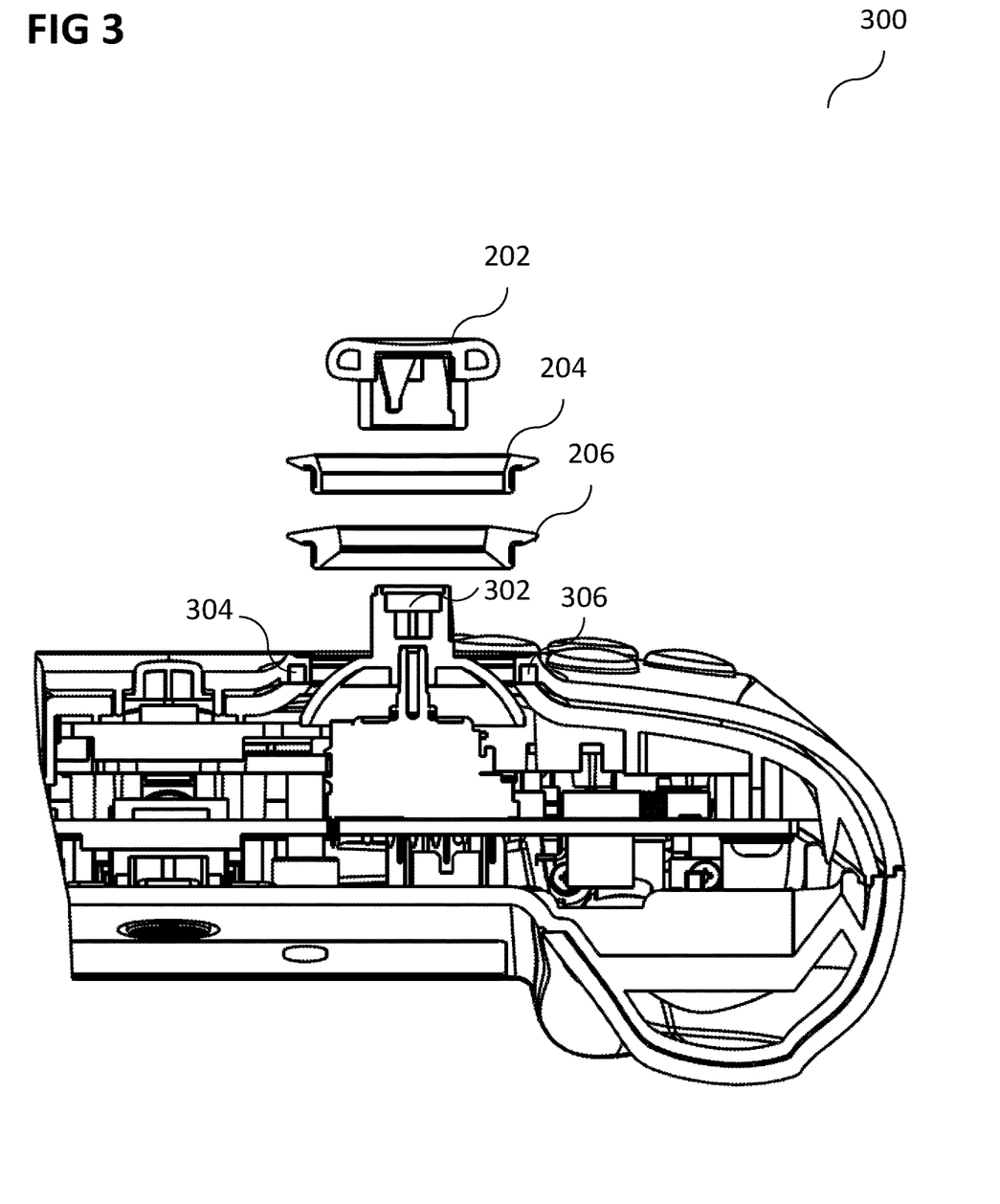
FIG. 3 shows a cross sectional view of the game controller according to various embodiments.

FIG. 3 shows a cross sectional view 300 of the game controller according to various embodiments. The removable thumb cap 202 may have an embedded ferromagnetic metal plate which may be attracted by a magnet 302 in the plunger of the joystick. The swappable rings (for example the large ring 204 and the small ring 206) may have embedded ferromagnetic metal inserts, which may be attracted by magnets 304 and 35 in the housing of the game controller.

In other words, both the removable thumb cap 202 and the swappable rings may have ferromagnetic metal parts embedded on them which may be pulled by magnets 302, 304, 306 that keep them in place on the (game) controller.

Figure 4:
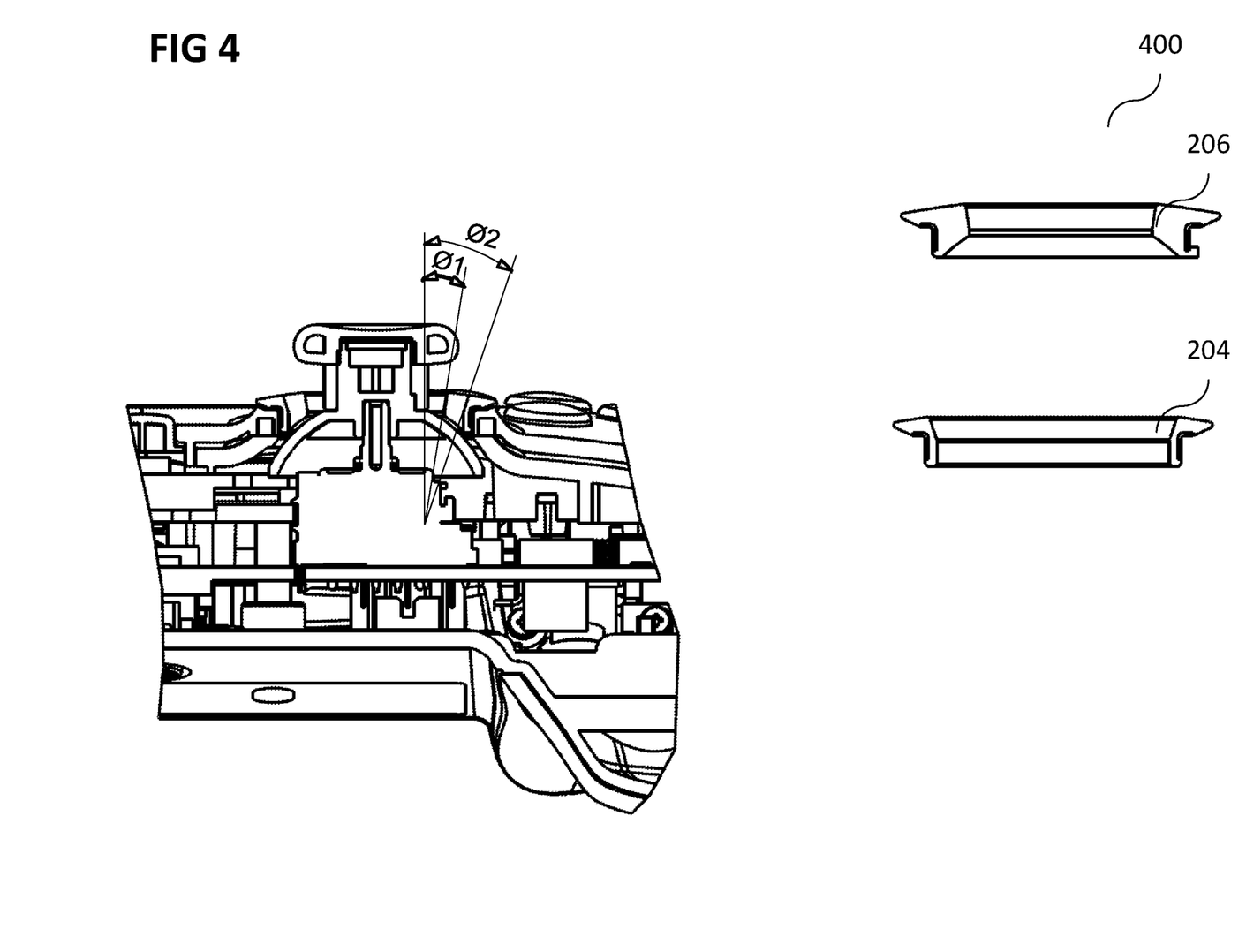
FIG. 4 shows an illustration of a range of motion of the thumb cap according to various embodiments.

FIG. 4 shows an illustration 400 of a range of motion of the thumb cap 202 (and thus the joystick) according to various embodiments. Each ring may offer (or provide or allow) a different angle (in other words: a different range of motion) that gives the different sensitivity outcome on game play. For example, the small ring 206 may allow an angle Ø1. For example, the large ring 204 may provide an angle Ø2.

Figure 5:
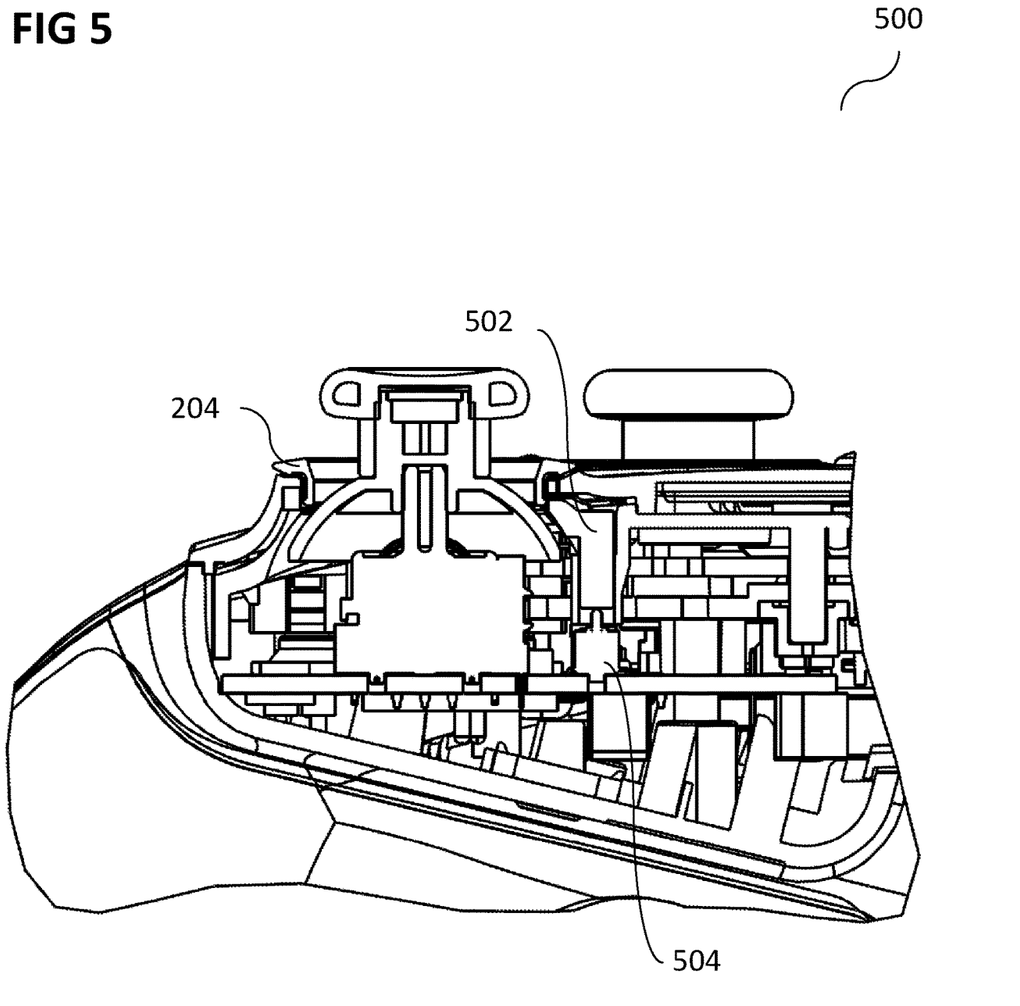
FIG. 5 shows an illustration of the large ring according to various embodiments.

FIG. 5 shows an illustration 500 of the large ring 204 according to various embodiments. An actuator 502 may be provided that activates a switch 504 to trigger a firmware change to recognize the shift in ring size. The large ring has no tab to push the switch 504 and may thus have a default firmware in use.

Figure 6:
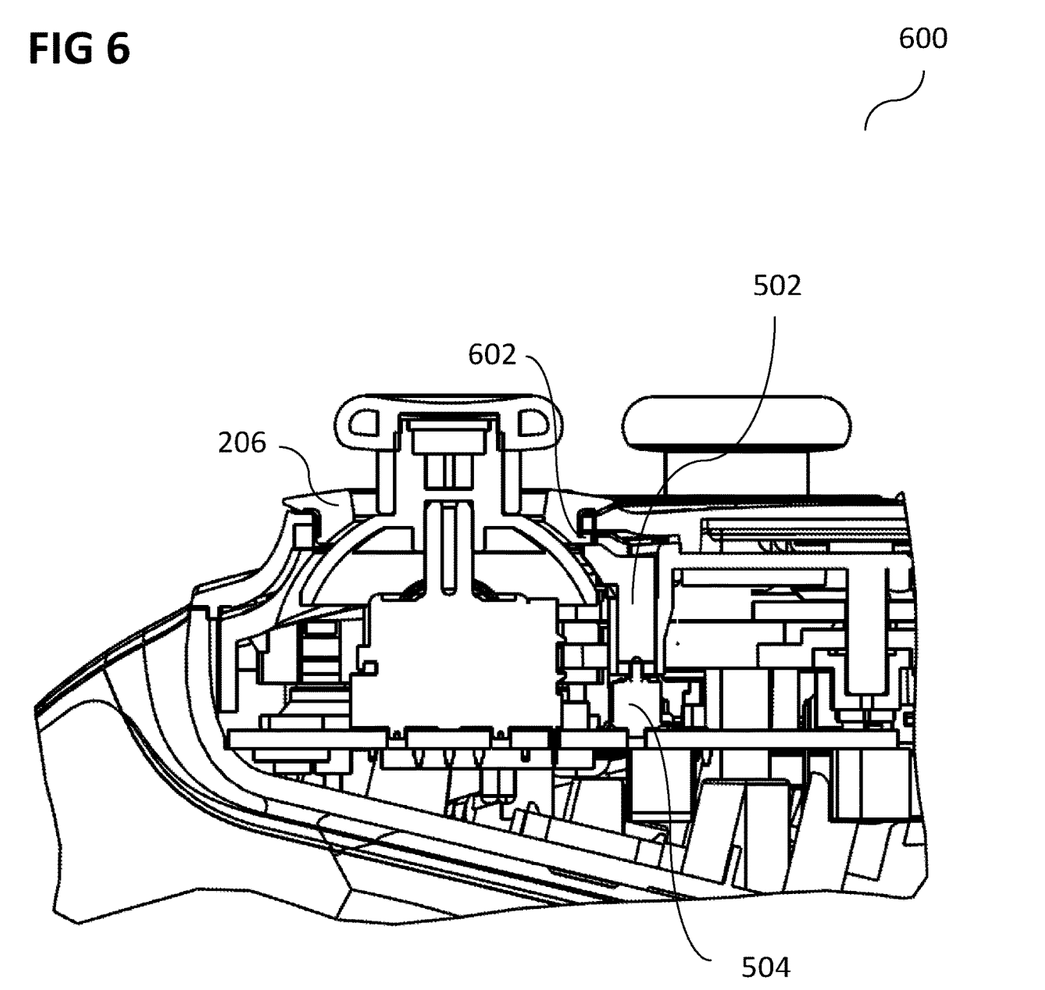
FIG. 6 shows an illustration of the small ring according to various embodiments.

FIG. 6 shows an illustration 600 of the small ring 206 according to various embodiments. The small ring 206 may have a tab 602 (in other words: a press tab feature) to push the switch 504 (via the actuator 502) thereby triggering a firmware change. The actuator 502 may maintain pressure on the switch 504 so that the firmware change is maintained.

Figure 7:
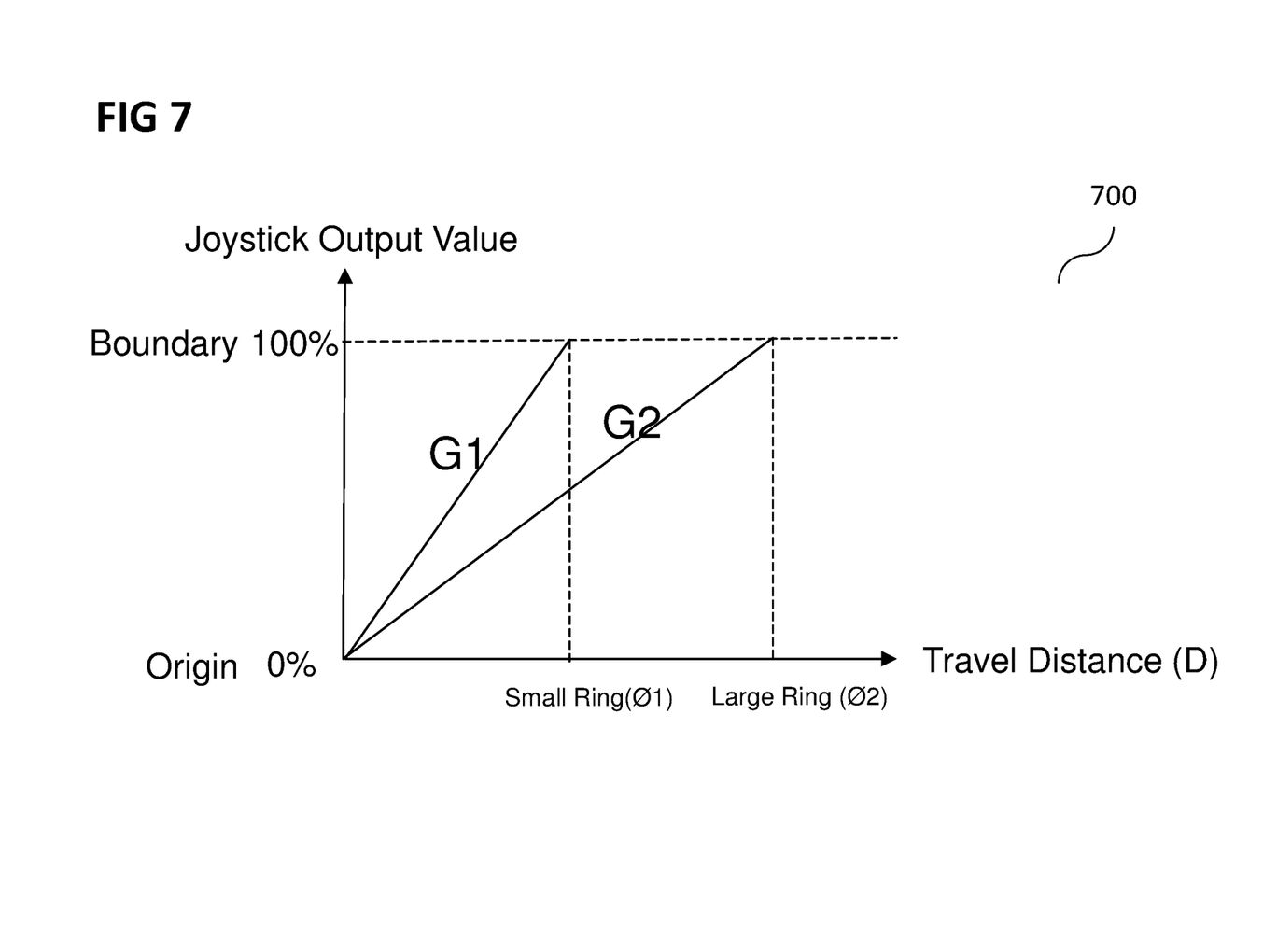
FIG. 7 shows a chart to explain how the ring size correlates the operation and sensitivity of the joystick according to various embodiments.

FIG. 7 shows a chart 700 to explain how the ring size correlates the operation and sensitivity of the joystick according to various embodiments. The big ring may have a longer travel distance, it may be arbitrarily set as default for normal operation and may correspond to a default sensitivity value in the default firmware. When the large ring is replaced with a smaller ring, the user may feel the short travel required to reach the boundary (the circumference of the joystick's physical operating circle) meanwhile the tab on the smaller ring may push the switch on the PCB (printed circuit) board through an actuator and the firmware may response by scaling the operating range (from center of the circle (origin) to the circumference of the circle (Boundary)) to the smaller ring, which may effectively increase the sensitivity value to a higher sensitivity value (of for example twice the sensitivity of the default value). The gradient of the graph of FIG. 7 equates to the Sensitivity of the joystick:

Sensitivity=Gradient

If $\varnothing 2 = 2 \times \varnothing 1$

Gradient $G1 = 100/\varnothing 1$

Gradient $G2 = 100/\varnothing 2 = 100/2S = 50/S$

Hence, $G1 = 2 \times G2$.

The small ring has higher sensitivity than the large ring, and the speed of operation may be faster as it takes shorter distance and hence lesser time to reach the boundary from origin.

Figure 8:
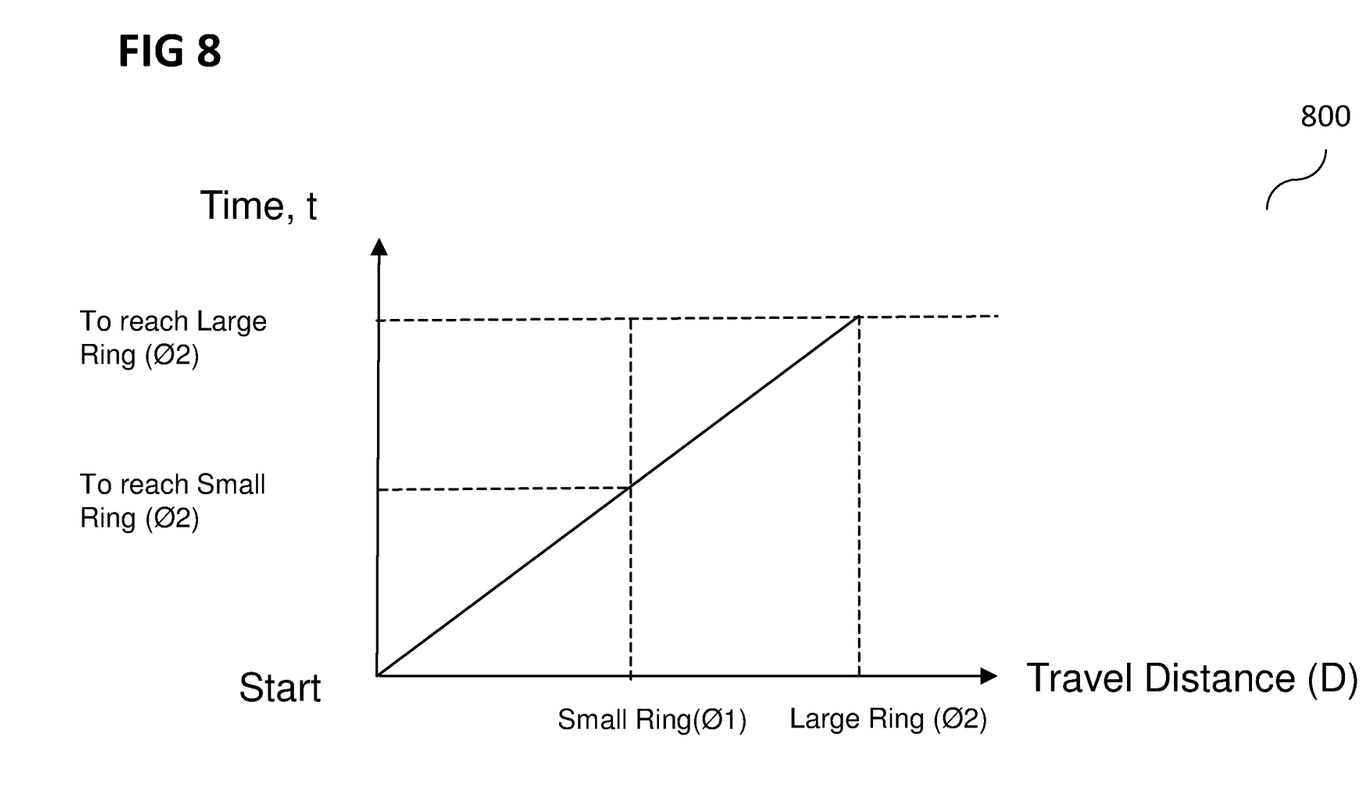
FIG. 8 shows a diagram illustrating that the speed of operation also increases with different rings according to various embodiments.

FIG. 8 shows a diagram 800 illustrating that the speed of operation also increases with different rings according to various embodiments as it takes a short time to reach the boundary (circumference) from the center of the circle (origin) while the output value from 0% to 100% changes correspondingly at faster rate.

According to various embodiments, when the large ring is replaced with a smaller ring, the user may feel the short travel required to reach the boundary (the circumference of the Joystick's physical operating circle); meanwhile the tab on the smaller ring may push the switch on the PCB (printed circuit board) through an actuator and the firmware may response by scaling the operating range (from center of the circle (origin) to the circumference of the circle (boundary)) to the smaller ring, which effectively may increase the sensitivity value to a higher sensitivity value (for example twice the sensitivity of the default value).

According to various embodiments, a variable sensitivity joystick may be provided. According to various embodiments, a controller variable joystick may be provided. According to various embodiments, a game controller variable sensitivity for thumbstick may be provided.

The following examples pertain to further embodiments.

Example 1 is a game controller comprising: a controller input; a receiving portion configured to alternatively receive a first ring or a second ring, wherein the first ring allows a first range of motion of the controller input, and wherein the second ring allows a second range of motion of the controller input; and a mechanical switch configured to receive mechanical input from at least one of the first ring or the second ring.

In example 2, the subject-matter of example 1 can optionally include that the at least one of the first ring or the second ring comprises a tab configured to depress the mechanical switch.

In example 3, the subject-matter of any one of examples 1 to 2 can optionally include that the at least one of the first ring or the second ring comprises a tab configured to depress the mechanical switch via an actuator.

In example 4, the subject-matter of any one of examples 1 to 3 can optionally include that the first ring comprises a tab configured to depress the mechanical switch via an actuator.

In example 5, the subject-matter of example 4 can optionally include that the second ring is free from a tab configured to depress the mechanical switch via an actuator.

In example 6, the subject-matter of any one of examples 1 to 5 can optionally include that the game controller is configured to transmit information indicating whether the mechanical switch is depressed to a computing device to which the game controller is connected.

In example 7, the subject-matter of any one of examples 1 to 6 can optionally include that the first ring comprises a hole of a first diameter configured to surround the controller input.

In example 8, the subject-matter of example 7 can optionally include that the second ring comprises a hole of a second diameter configured to surround the controller input.

In example 9, the subject-matter of example 8 can optionally include that the first diameter is smaller than the second diameter.

In example 10, the subject-matter of any one of examples 1 to 9 can optionally include that the first range of motion is smaller than the second range of motion.

Example 11 is a method for controlling a game controller, the method comprising: providing a controller input; providing a receiving portion to alternatively receive a first ring or a second ring, wherein the first ring allows a first range of motion of the controller input, and wherein the second ring allows a second range of motion of the controller input; and receiving mechanical input from at least one of the first ring or the second ring.

In example 12, the subject-matter of example 11 can optionally include that the at least one of the first ring or the second ring comprises a tab configured to depress the mechanical switch.

In example 13, the subject-matter of any one of examples 11 to 12 can optionally include that the at least one of the first ring or the second ring comprises a tab configured to depress the mechanical switch via an actuator.

In example 14, the subject-matter of any one of examples 11 to 13 can optionally include that the first ring comprises a tab configured to depress the mechanical switch via an actuator.

In example 15, the subject-matter of example 14 can optionally include that the second ring is free from a tab configured to depress the mechanical switch via an actuator.

In example 16, the subject-matter of any one of examples 11 to 15 can optionally include transmitting information indicating whether the mechanical switch is depressed to a computing device to which the game controller is connected.

In example 17, the subject-matter of any one of examples 11 to 16 can optionally include that the first ring comprises a hole of a first diameter configured to surround the controller input.

In example 18, the subject-matter of example 17 can optionally include that the second ring comprises a hole of a second diameter configured to surround the controller input.

In example 19, the subject-matter of example 18 can optionally include that the first diameter is smaller than the second diameter.

In example 20, the subject-matter of any one of examples 11 to 19 can optionally include that the first range of motion is smaller than the second range of motion.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A game controller comprising:
   a controller input;
   a first ring;
   a second ring;
   a receiving portion configured to alternatively receive the first ring or the second ring, wherein the first ring allows a first range of motion of the controller input, and wherein the second ring allows a second range of motion of the controller input; and
   a mechanical switch configured to receive mechanical input from at least one of the first ring or the second ring;
   wherein the first ring comprises a tab configured to depress the mechanical switch; and
   wherein the second ring is free from a tab configured to depress the mechanical switch; and
   wherein the game controller is configured to transmit information indicating whether the mechanical switch is depressed by the tab of the first ring to a computer device to which the game controller is connected.

2. The game controller of claim 1,
   wherein the tab is configured to depress the mechanical switch via an actuator.

3. The game controller of claim 1,
   wherein the first ring comprises a hole of a first diameter configured to surround the controller input.

4. The game controller of claim 3,
   wherein the second ring comprises a hole of a second diameter configured to surround the controller input.

5. The game controller of claim 4,
   wherein the first diameter is smaller than the second diameter.

6. The game controller of claim 1,
   wherein the first range of motion is smaller than the second range of motion.

7. The game controller of claim 1, further comprising
   a printed circuit board on which the mechanical switch is provided.

8. The game controller of claim 7,
   wherein when mechanical switch is depressed, the printed circuit board is configured to adjust a sensitivity configuration of the controller input.

9. A method for controlling a game controller, the method comprising:
   providing a first ring;
   providing a second ring;
   providing a controller input;
   providing a receiving portion to alternatively receive the first ring or the second ring, wherein the first ring allows a first range of motion of the controller input, and wherein the second ring allows a second range of motion of the controller input; and
   receiving mechanical input from at least one of the first ring or the second ring;
   wherein the first ring comprises a tab configured to depress the mechanical switch;
   wherein the second ring is free from a tab configured to depress the mechanical switch; and
   transmitting information indicating whether the mechanical switch is depressed by the tab of the first ring to a computing device to which the game controller is connected.

10. The method of claim 9,
    wherein the tab is configured to depress the mechanical switch via an actuator.

11. The method of claim 9,
    wherein the first ring comprises a hole of a first diameter configured to surround the controller input.

12. The method of claim 11,
    wherein the second ring comprises a hole of a second diameter configured to surround the controller input.

13. The method of claim 12,
    wherein the first diameter is smaller than the second diameter.

14. The method of claim 9,
    wherein the first range of motion is smaller than the second range of motion.

15. The method of claim 9,
    wherein the mechanical switch is provided on a printed circuit board.

16. The method of claim 15,
    wherein when mechanical switch is depressed, the printed circuit board is configured to adjust a sensitivity configuration of the controller input.

* * * * *